(12) United States Patent
Su et al.

(10) Patent No.: US 11,301,843 B2
(45) Date of Patent: Apr. 12, 2022

(54) SYSTEM AND METHOD FOR BLOCKCHAIN BASED DOCUMENT PROCESSING

(71) Applicant: Toshiba TEC Kabushiki Kaisha, Shinagawa-ku (JP)

(72) Inventors: William Su, Riverside, CA (US); Jia Zhang, Irvine, CA (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 367 days.

(21) Appl. No.: 16/437,066

(22) Filed: Jun. 11, 2019

(65) Prior Publication Data
US 2020/0394647 A1 Dec. 17, 2020

(51) Int. Cl.
*G06Q 20/00* (2012.01)
*G06Q 20/36* (2012.01)
*G06F 16/23* (2019.01)

(52) U.S. Cl.
CPC ..... *G06Q 20/3678* (2013.01); *G06F 16/2379* (2019.01); *G06Q 2220/00* (2013.01)

(58) Field of Classification Search
CPC ........... G06Q 20/3678; G06Q 2220/00; G06Q 20/065; G06F 16/2379
USPC ................................ 705/16, 21; 380/44, 262
See application file for complete search history.

(56) References Cited

U.S. PATENT DOCUMENTS

2019/0109713 A1* 4/2019 Clark .................... H04L 9/3239

\* cited by examiner

*Primary Examiner* — Dante Ravetti
(74) *Attorney, Agent, or Firm* — Ulmer & Berne LLP (57) ABSTRACT

A system and method for blockchain-based document processing includes a processor, network interface, print engine, scan engine, and a memory storing a blockchain ledger. The blockchain ledger includes time stamped blocks, each block including currency data associated with a digital currency value. The processor generates a block corresponding to a received instruction, a preexisting currency value associated with the received instruction and contract data corresponding to a smart contract associated with the received instruction. The processor updates the blockchain ledger with a generated block and shares an updated blockchain ledger with other networked data devices via the network interface. The processor also receives verification of the updated blockchain ledger from the other networked data devices. The processor executes the smart contract upon receipt of verification.

14 Claims, 9 Drawing Sheets

SYSTEM AND METHOD FOR BLOCKCHAIN BASED DOCUMENT PROCESSING

TECHNICAL FIELD

This application relates generally to network-based document processing operations. The application relates more particularly to management of document processing device transactions using a distributed blockchain ledger system.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Document processing operations on MFPs can consist of creation, transmission, storage or printing of electronic documents, as well as creation of electronic documents from tangible media, such by scanning and digitizing. Document processing operations are frequently subject to cost assessment due to the expense of obtaining and maintaining MFPs.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Payment for MFP document processing operations, such as on a school campus, can occur by one or more payment methods, such as via a campus card, a credit/debit card, a prepaid print card or a student account. However, most MFPs lack the hardware or software features needed for payment activities, such as card swipes.

In an example embodiment disclosed herein, a system and method for blockchain-based document processing includes a processor, network interface, print engine, scan engine, and a memory storing a blockchain ledger. The blockchain ledger includes time stamped blocks, each block including currency data associated with a digital currency value. The processor generates a block corresponding to a received instruction, a preexisting currency value associated with the received instruction and contract data corresponding to a smart contract associated with the received instruction. The processor updates the blockchain ledger with a generated block and shares an updated blockchain ledger with other networked data devices via the network interface. The processor also receives verification of the updated blockchain ledger from the other networked data devices. The processor executes the smart contract upon receipt of verification.

Further example embodiments herein include an MFP cryptocurrency via a peer-to-peer, digital cryptocurrency to facilitate MFP payments, as well as for payout to third-parties such as an attorney or accountant. In this example, a paper document is formed with two header pages to manage payment and set forth a smart contract. A smart contract is a computer protocol intended to digitally facilitate, verify, or enforce the negotiation or performance of a contract. Smart contracts allow the performance of credible transactions without third parties. These transactions are trackable and irreversible. With smart contracts, kinds of contractual clauses may be made partially or fully self-executing, self-enforcing, or both. Smart contracts can provide security that is superior to traditional contract law and to reduce other transaction costs associated with contracting. Cryptocurrencies are suitably implemented types of smart contracts.

When a user wants to copy or print a document, the first page is formed as an encrypted paper wallet. Paper wallets are often a very secure way of storing MFP cryptocurrency, since they are not typically exposed to malware. A user enters a passphrase and sets a maximum cost. MFP scans the paper wallet and MFP transfers a portion of the fund (max cost—software wallet balance) to software wallet. The software wallet will be used to pay for printing and executing the smart contract. MFP suitably disconnects from the Internet and generates and prints a new paper wallet.

The second page is a smart contract. MFP scans the smart contract and deploys the smart contract to the blockchain network. A smart contract is a blockchain technology consisting of an algorithm that stores terms of agreements and automatically executes those terms. For example, if the printed document is digitally signed by an attorney, the user agrees to transfer funds to the attorney.

Figure 1:
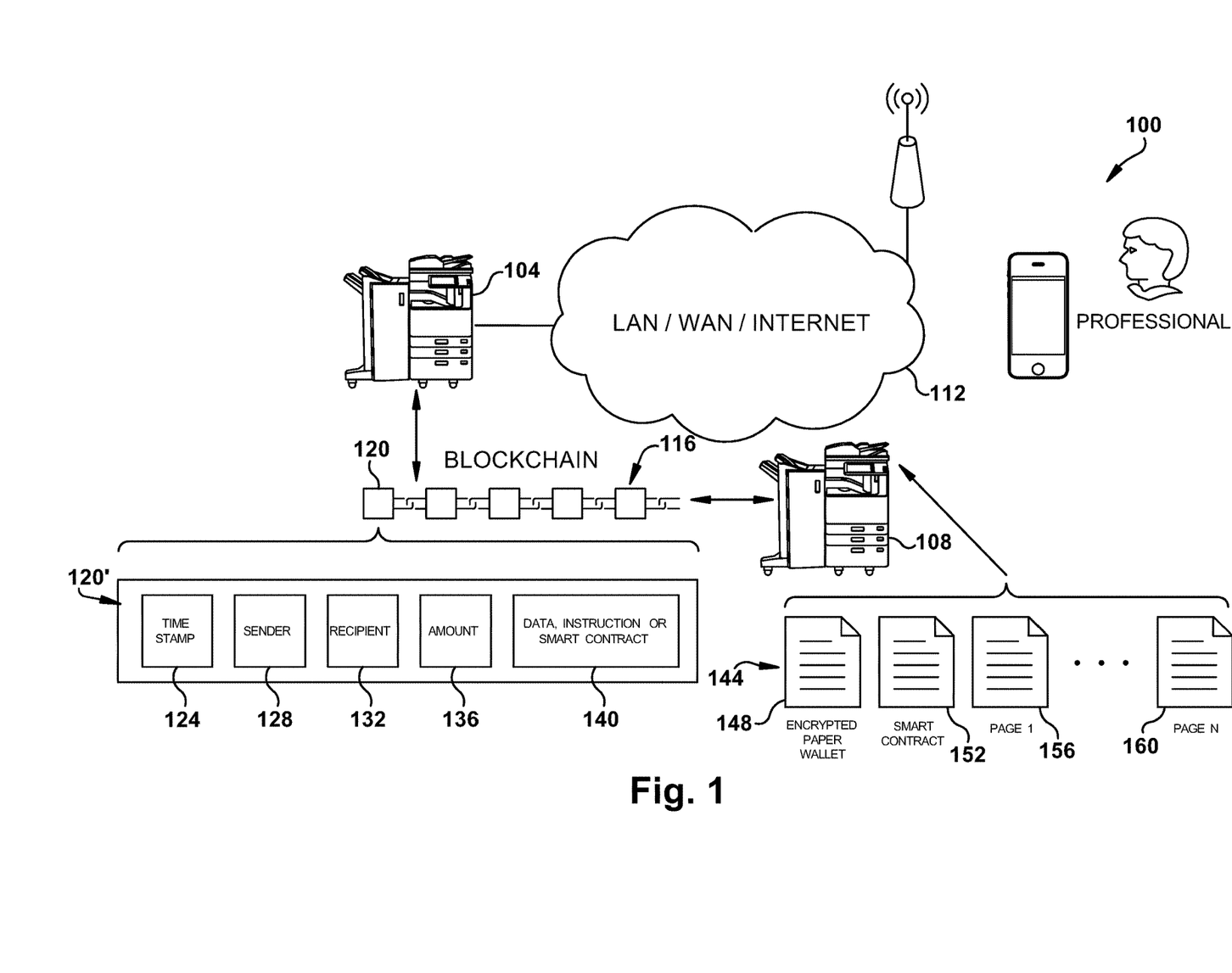
FIG. 1 is an example embodiment of a system for management of document processing device transactions using a distributed blockchain ledger system.

In accordance with the subject application, FIG. 1 illustrates an example embodiment of a system 100 for management of document processing device transactions using a distributed blockchain ledger system. The system 100 includes a plurality of networked MFPs, illustrated by MFPs 104 and 108. Networked MFPs are in data communication via network cloud 112, suitably comprised of a local area network (LAN), or wide area network (WAN) which may comprise the Internet. Data communication is via any suitable wired, wireless or optical connection, or any combination thereof. A blockchain ledger is shared among networked data devices, which may include the plurality of MFPs or any other suitable computing platform, such as a server or workstation. Blockchain 116 is comprised of a linked sequence of data blocks, such as block 120. Example block 120 includes data portions as illustrated by a blowup 120' of data block 120. Included in data block 120' is a time stamp 124, a sender identifier 128, a recipient identifier 132, an amount identifier 136 and a data block 140, suitably carrying data such as a document processing instruction or smart contract instruction. Paper document stack 144 includes an encrypted paper wallet sheet 148, an encoded smart contract sheet 152, and one or more pages comprising a tangible document for processing as illustrated as sheets 156 through 160. These sheets are suitably scanned and digitized by MFP 108 in the illustrated example embodiment.

Figure 2:
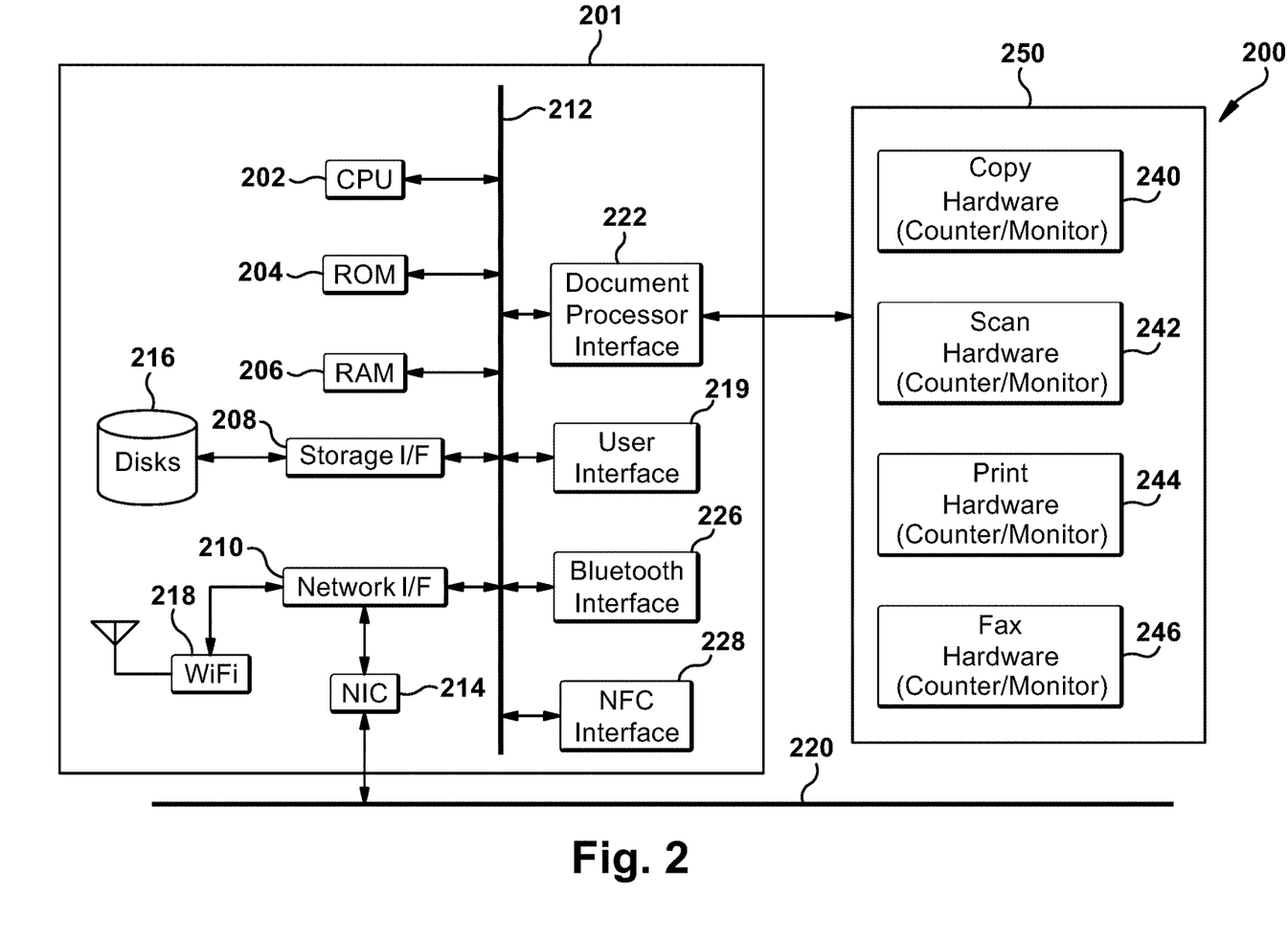
FIG. 2 is an example embodiment of a multifunction peripheral.

Turning now to FIG. 2 illustrated is an example embodiment of a MFP device comprised of a document rendering system 200 suitably comprised within an MFP, such as with MFPs 104 or 108 FIG. 1. Included in intelligent controller 201 are one or more processors, such as that illustrated by processor 202. Each processor is suitably associated with non-volatile memory, such as ROM 204, and random access memory (RAM) 206, via a data bus 212. A blockchain ledger is suitably stored in writable memory, such as RAM 206.

Processor 202 functions to receive an instruction, such as a document processing instruction, a financial instruction or an instruction relative to a smart contract. Processor 202 creates a new block for the blockchain in accordance with a received instruction. Blocks include blockchain content data corresponding to time stamp, sender, recipient, amount or other data.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth 226, NFC 228, wireless universal serial bus (wireless USB), satellite, and the like. Example wired interfaces include Ethernet, USB, IEEE 1394 (FireWire), Lightning, telephone line, or the like. Network interface 210 functions to exchange blockchain information with other networked devices for purposes of blockchain verification or activities relating to document processing operations, financial transactions or smart contracts.

Processor 202 can also be in data communication with any suitable user input/output (I/O) interface 219 which provides data communication with user peripherals, such as displays, keyboards, mice, track balls, touch screens, or the like. Also in data communication with data bus 212 is a document processor interface 222 suitable for data communication with MFP functional units 250. In the illustrated example, these units include a copy hardware 240, scan hardware 242, print hardware 244 and fax hardware 246 which together comprise MFP functional hardware 250. It will be understood that functional units are suitably comprised of intelligent units or engines, including any suitable hardware or software platform.

Figure 3:
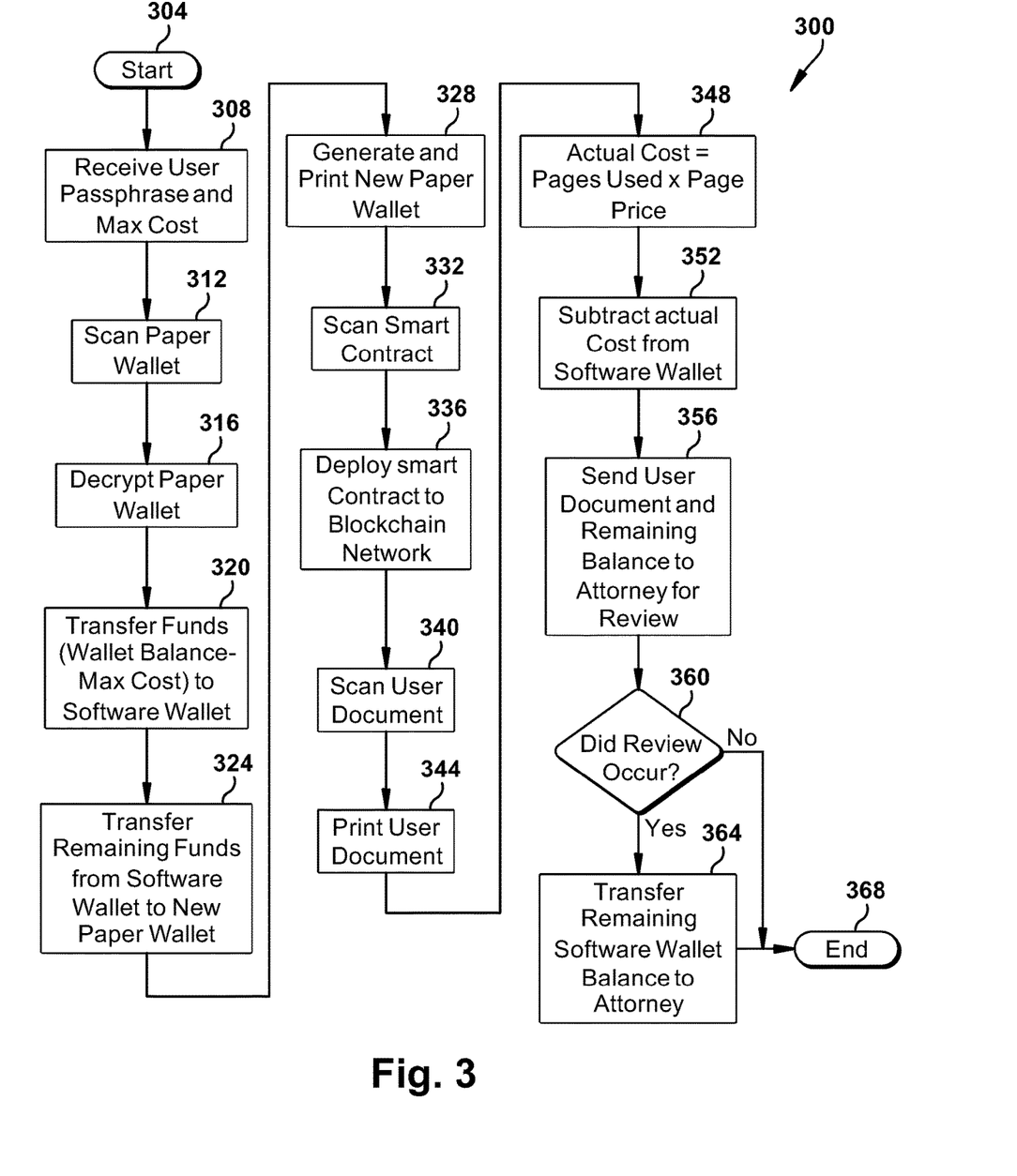
FIG. 3 is a flowchart of operations of an example embodiment of a system for management of document processing device transactions using a distributed blockchain ledger.

FIG. 3 illustrates a flowchart 300 for an example embodiment of a system for management of document processing device transactions using a distributed blockchain ledger system. In the illustrated example, a user wishes to copy a document, such as a legal contract, and have it reviewed by a lawyer. The process commences at block 304, and proceeds to block 308 where a user's passphrase and maximum cost value are received. Next, a paper wallet sheet is scanned at block 312 and decrypted at block 316. Funds, comprised of the current wallet balance less the received maximum cost, are transferred to a software wallet at block 320. Remaining funds are transferred from the software wallet to a new paper wallet at block 324. A new paper wallet is generated and printed at block 328.

Next, a scan is made of a smart contract to engage an attorney document review at block 332, and the smart contract is deployed to a blockchain network at block 336. A user document is scanned at block 340 and printed at block 344. An actual cost is calculated at block 348 from pages printed multiplied by a cost per page. The actual cost is subtracted from what remains in the software wallet at block 352, presumably with sufficient funds remaining to fund the contract for attorney review. The remaining balance and document is sent to the attorney at block 356. If the amount is sufficient, the attorney completes a review. If a review is determined to occur at block 360, the funds are transferred to the attorney at block 364 and the process ends at block 368. If no review occurs, such as when the remaining funds were insufficient, the process proceeds directly from block 360 to block 368. The user is suitably notified relative to the success or failure of the review. If any funds remain in the user's software wallet, they are suitably added to the user's soft wallet the next time it is created from a scan of their paper wallet.

Figure 4:
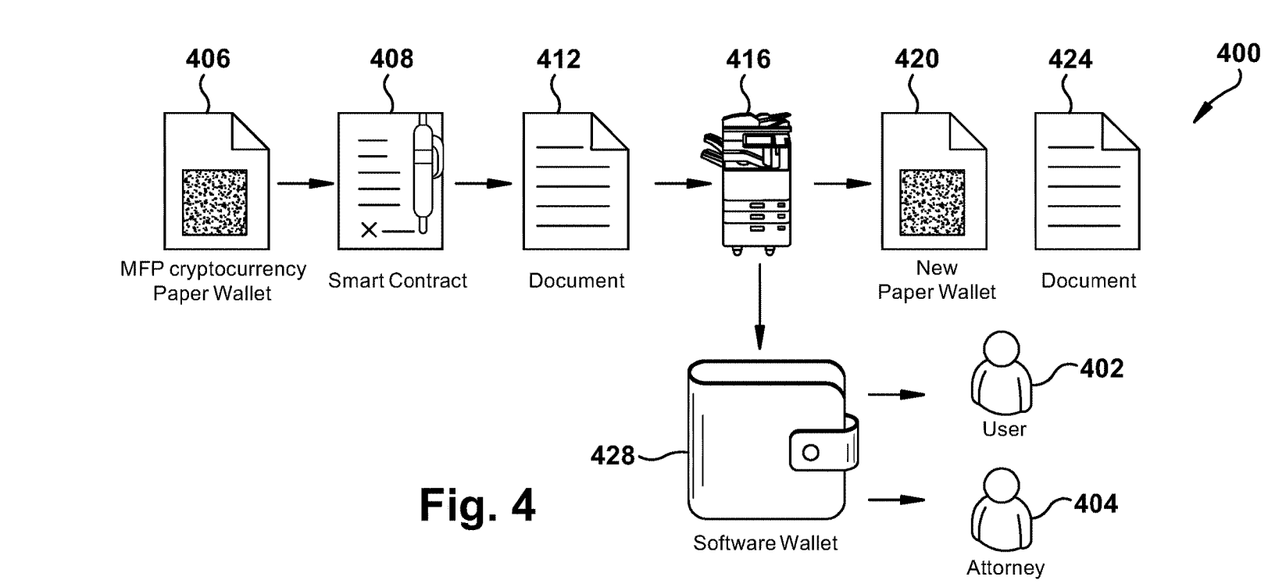
FIG. 4 is an example embodiment of a managed document processing device transaction.

FIG. 4 illustrates a flow diagram 400 of an example embodiment of a managed document processing device transaction between user 402 and attorney 404. A paper wallet 406, a smart contract 408 and a document 412 are scanned into MFP 416. While one page is illustrated for the smart wallet 406, the smart contract 408 and the document 408, each may comprise two or more pages, printed on one or both sides. The MFP 416 generates printouts of new paper wallet 420, modified such as described with FIG. 3, above, as well as copy 424 of input document 412. Cryptocurrency debited from the user's initial paper wallet 406 is placed in software wallet 428 and made available for transfer to attorney 404, such as described above.

Figure 5:
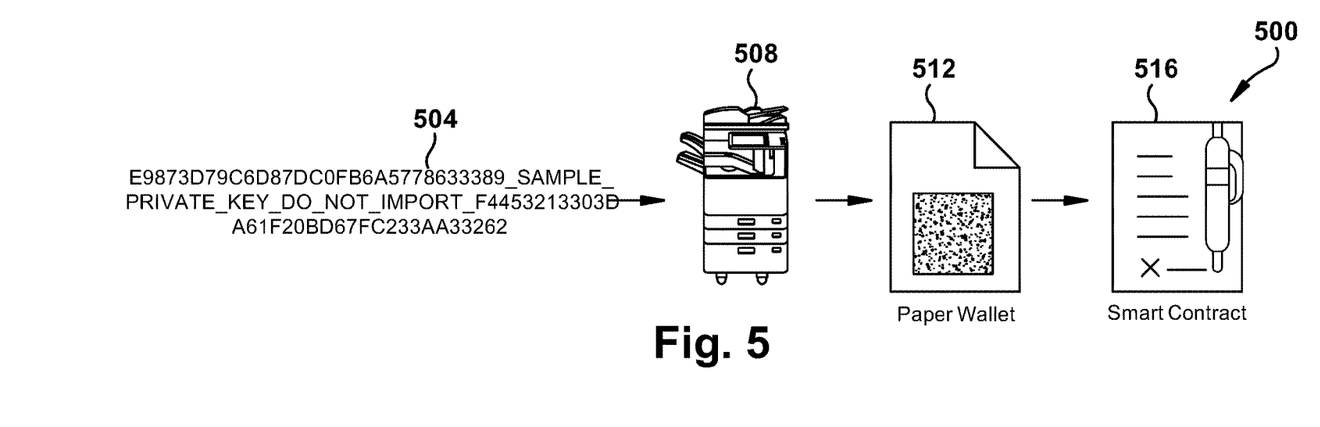
FIG. 5 is an example embodiment of creation of a paper wallet.

FIG. 5 is a block diagram 500 of an example embodiment of creation of a paper wallet. A user suitably enters their private key 504 into MFP 508 which, in turn, suitably identifies the associated user to generate paper wallet 512 with an amount available to the user, along with smart contract 516 selected by the user. By way of particular example, the user can select a legal contract stored online, on the MFP 508 or on a user device or portable storage. The user can also select a smart contract 516, stored online, on the MFP 508 or on a user device or portable storage, which smart contract 516 is to engage an attorney for review of the legal contract.

Figure 6:
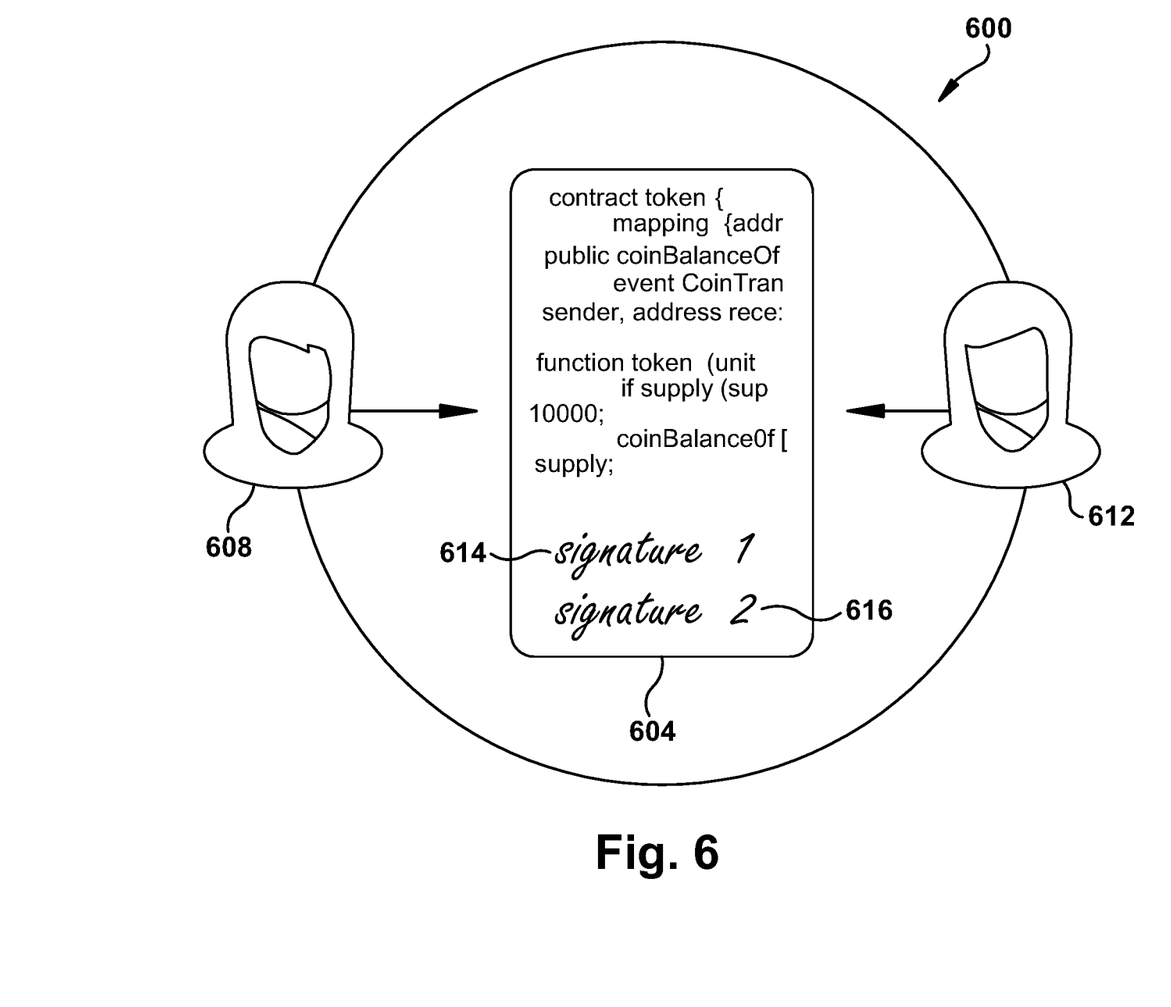
FIG. 6 is an example embodiment of a visualization of a smart contract between user and user.

FIG. 6 is a visualization 600 of a smart contract 604 between user 608 and user 612, corresponding with verification signatures 614 and 618, suitably electronic signatures, which denote acceptance of the smart contract.

In another example embodiment, a blockchain ledger serves to decentralize MFP actions such that a user is freed from keeping and carrying documents and paperwork while allowing the user to submit a print job and release the job at any MFP that is part of the blockchain network. A decentralized MFP, suitably referred to as a world MFP, is a completely decentralized MFP that may be distributed across small, large or even global geographic areas by employing blockchain technology. Any MFP can participate in the peer-to-peer network by relaying transactions and blocks as well as verifying the blockchain. MFPs are also enabled to complete bit mining, suitably by activity on their integrated intelligent controller. Every participated MFP (node) owns the blockchain and shares blocks and transactions across the network. The blockchain stores data such as amount, print jobs, such as Printer Control Language (PCL) or Postscript (or PS), and data, such as instructions or smart contract data.

MFPs in a common network are provided with a common framework to instruct an MFP to print documents or run smart contracts. Users who submit or release a print job, or create or execute a smart contract, must pay a certain price to execute it. Costs are suitably based on number of pages, toner used and how complicated the smart contract's instruction is. The system suitably operates via a suitable cryptocurrency, such as bitcoin, which forms the MFP coins that fund operations on the network.

In an example embodiment, any given block on the blockchain can contain five kinds of transactions:

Transfer MFP coins to another user,
Submit a print job,
Release a print job,
Create a smart contract, or
Execute a smart contract.

A smart contract allows user to print document based on external data such as weather or interest rates. Execution of a smart contract can act on the occurrence of one or more events. For example, if a user's favorite sports team wins today's game, print the result.

The blockchain is suitably based on a suitable consensus algorithm. One example is Proof of Stake. Proof of Stake (PoS) is a type of consensus algorithm by which a cryptocurrency blockchain network aims to achieve distributed consensus. In PoS-based cryptocurrencies, the creator of the next block is chosen via various combinations of random selection and wealth or age (i.e., the stake). In contrast, the algorithm of proof-of-work-based cryptocurrencies such as bitcoin uses mining; that is, the solving of computationally intensive puzzles to validate transactions and create new blocks.

Instead of special mining hardware being required to create blocks, the MFPs suitably creates blocks. The framework mines or validates block transactions according to how many jobs the MFP prints. This means that the more jobs that are printed by an MFP, the more mining power the MFP has.

In accordance with example embodiments such as that noted above, a decentralized printing system allows a user to submit a print job and release the job at any MFP. Use of a decentralized MFP suitably makes it impossible for a user to renege on a transaction. If there is no regulation or bad printing habits, a user will be free to print. The decentralized MFP functions as a wallet that allows a user to make transactions.

Figure 7:
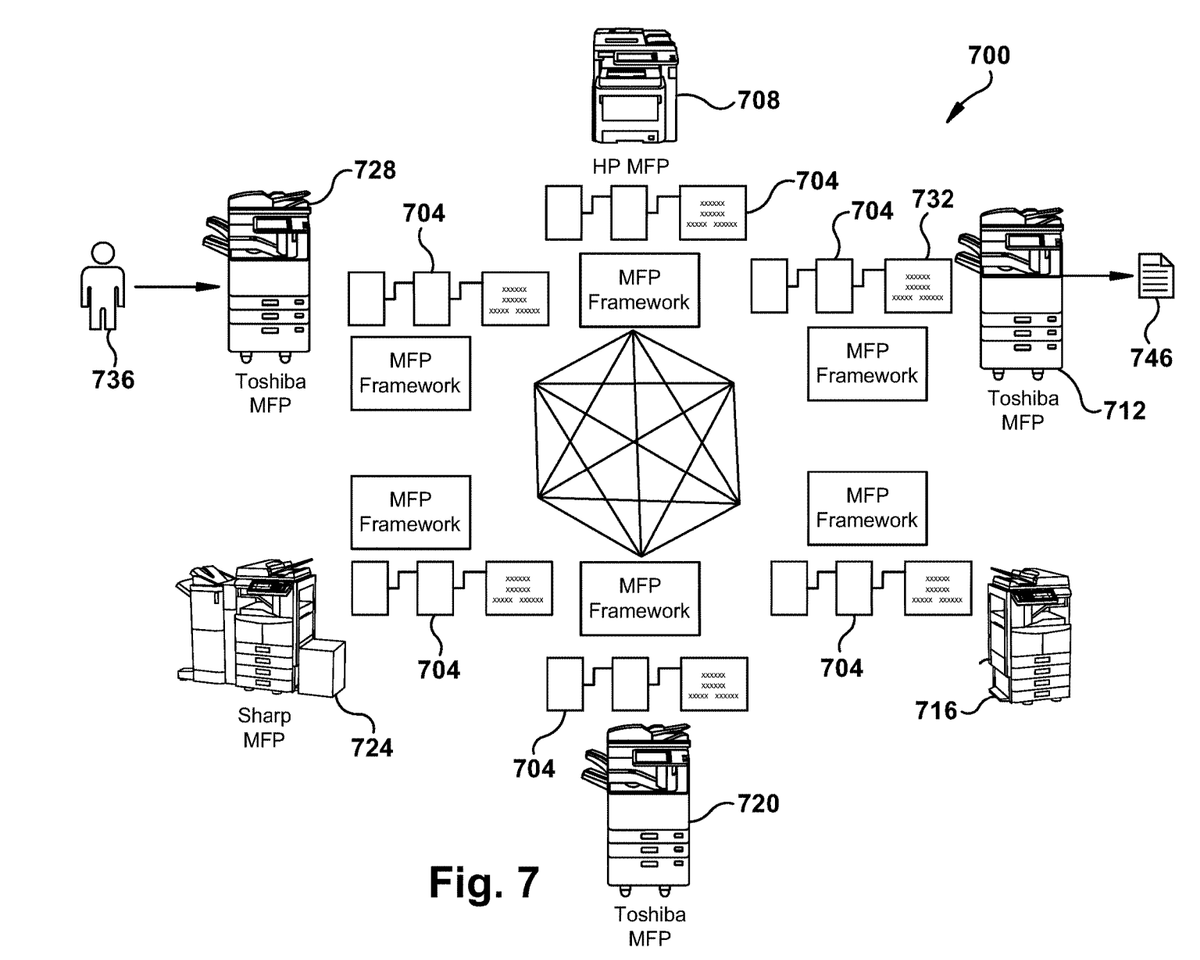
FIG. 7 is an example embodiment of a decentralized multifunction peripheral.

FIG. 7 illustrates an example embodiment of a decentralized MFP 700 comprised of a distributed set of MFPs that can be comprised of various models from various manufacturers, each running a common framework. Blockchain 704 is provided on each of MFPs 708, 712, 716, 720, 724 and 728 in the illustrated example. Blockchain 704 is associated with blocks, illustrated at block 732, which includes data corresponding to an amount of cryptocurrency, a document processing job and a smart contract. User 736 may submit a job at any MFP, such as MFP 728 and have it processed at any MFP, such as generating a printout 746 at MFP 712 as illustrated in the example embodiment.

Figure 8:
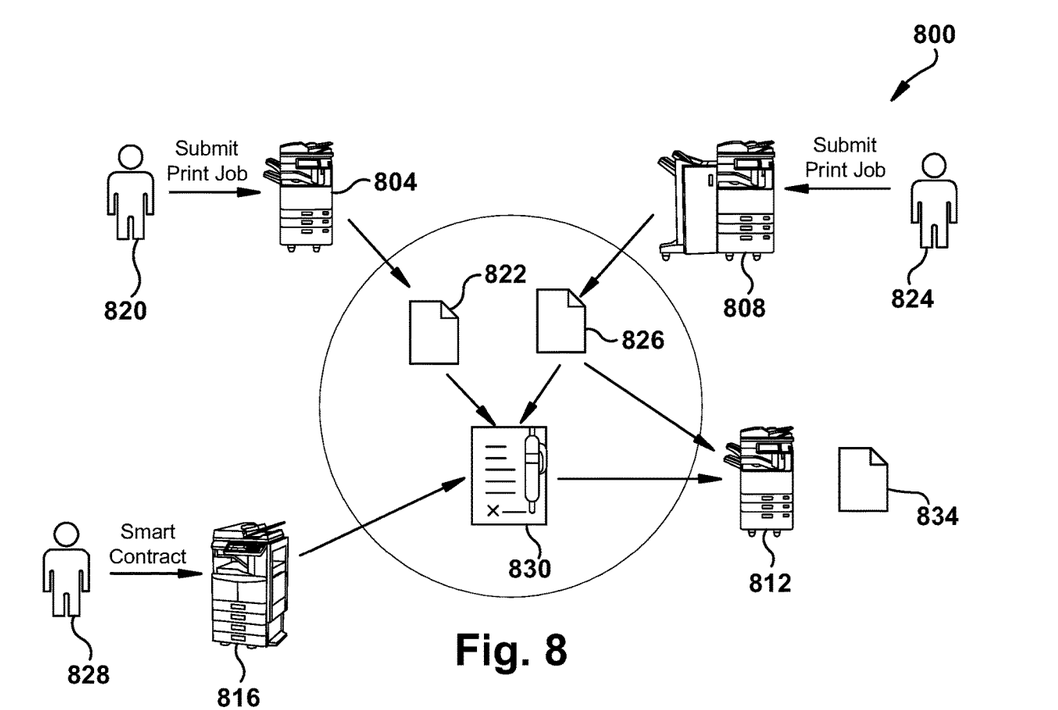
FIG. 8 is an example embodiment of a decentralized multifunction peripheral.

FIG. 8 illustrates an example embodiment of operation of a decentralized MFP system 800 comprised of MFPs 804, 808, 812 and 816. In the example, user 820 submits print job 822 at MFP 804, user 824 submits print job 826 to MFP 808 and user 828 submits smart contract 830 at MFP 816. Smart contract 830 triggers a combination of print jobs 822 and 826 and a printing 834 at MFP 812. Such printing is suitably triggered further by occurrence of an event, such as an external event, such as illustrated in FIG. 9.

Figure 9:
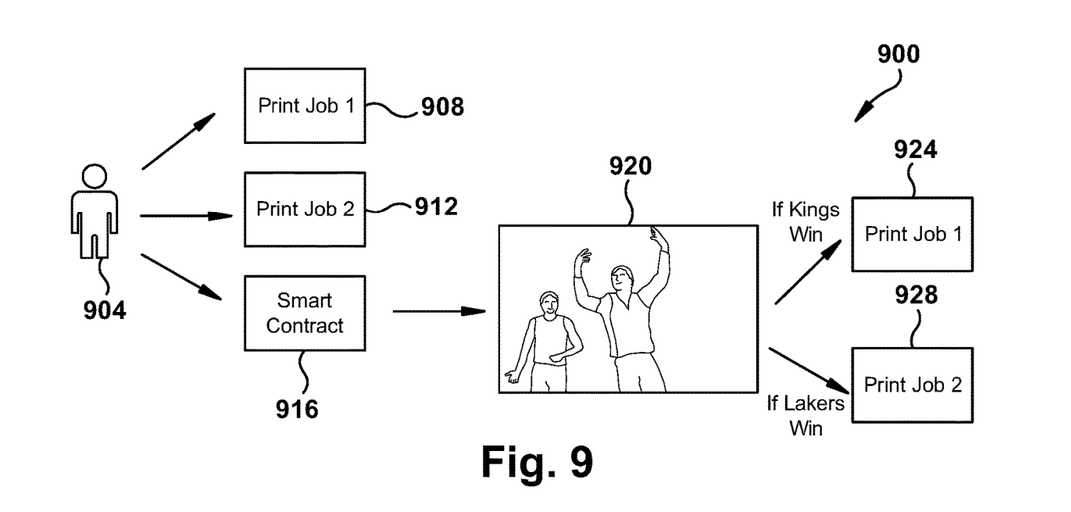
FIG. 9 is an example embodiment of a document processing job controlled by a smart contract operating in conjunction with an external event.

Referring now to FIG. 9, illustrated is an example embodiment 900 of a document processing job controlled by a smart contract operating in conjunction with an external event. User 904 submits print jobs 908 and 912, along with smart contract 916, at any MFP in the network. In the example, printing is contingent on a basketball game outcome 920 between the Kings and the Lakers. In the example, the event is suitably monitored on a networked news reporting server. If the Kings win, print job 1 is printed at 924. If the Lakers win, print job 2 is printed at 928.

Figure 10:
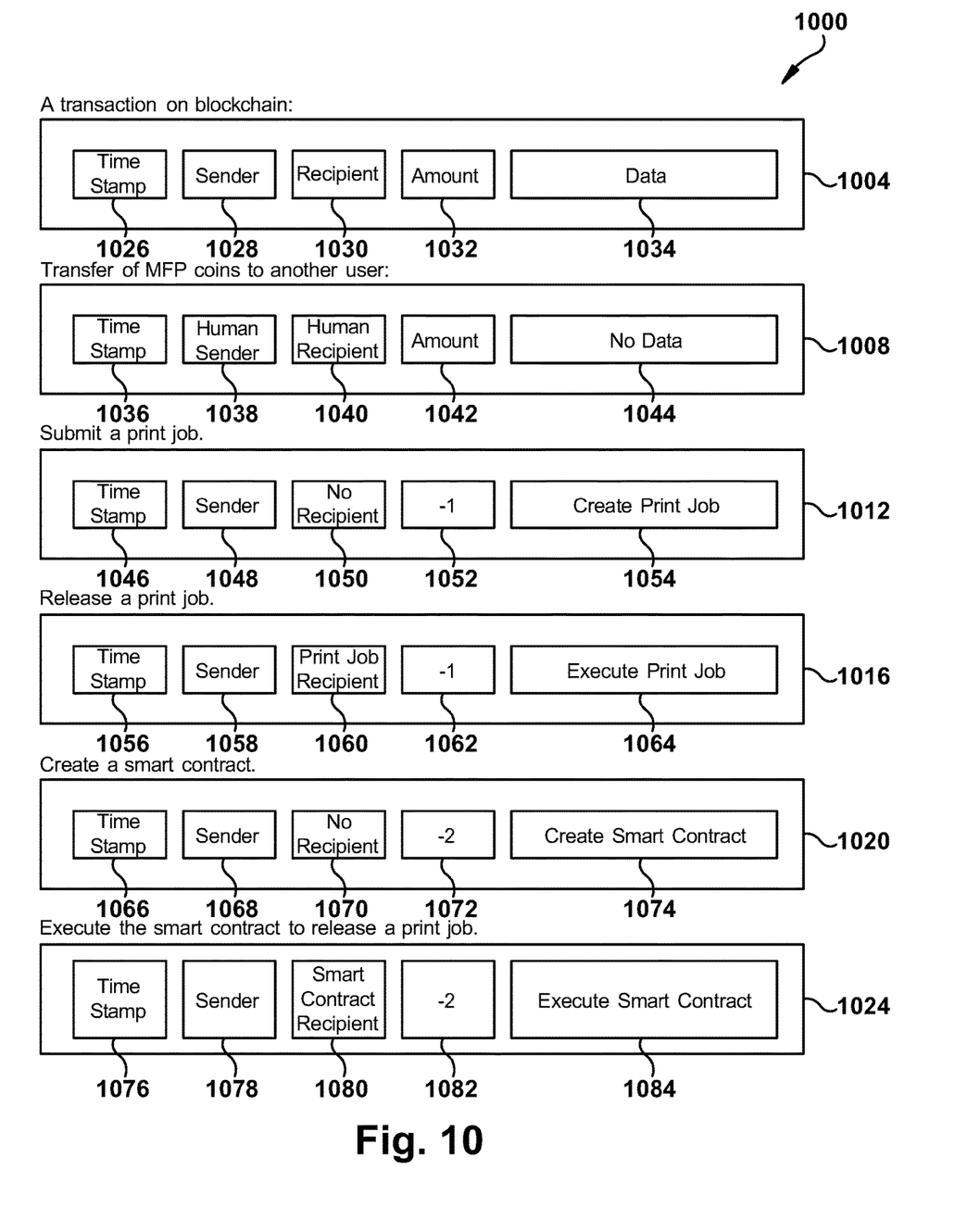
FIG. 10 is an example embodiment of blockchain block structures.

FIG. 10 illustrates block structure examples 1000, including blocks 1004, 1008, 1012, 1016, 1020 and 1024. Block 1004 illustrates blockchain content data corresponding to time stamp 1026, sender 1028, recipient 1030, amount 1032 and data 1034. Block 1008 illustrates blockchain content data corresponding to a transfer of cryptocurrency which includes data corresponding to time stamp 1036, human sender 1038, human recipient 1040 and transfer amount 1042. In such a transfer block, no data need be provided as illustrated at 1044. Data corresponding to an amount can be a preexisting currency value or a value relative to a debit or credit such as for a cost for commencing or executing a document processing operation, or commencing or executing a smart contract.

Block 1012 illustrates blockchain data corresponding to a document processing job submission, such as a print job submission. Included is data corresponding to time stamp 1046 and sender 1048. As the target is a just to generate printout data, no recipient need be reflected at block 1050. A debit amount is reflected at block 1052, and a print job creation instruction reflected at block 1054.

Block 1016 illustrates blockchain data corresponding to a print job release. Included is data corresponding time stamp 1056, sender 1058, print job recipient 1060, debit 1062 and an instruction 1064 to execute the print job.

Block 1020 illustrates blockchain data corresponding to creation of a smart contract. Included is time stamp 1066, sender 1068, with no recipient needed to be specified at block 1070. Also included is data corresponding to a debit amount 1072 and an instruction 1074 to create a smart contract.

Block 1024 illustrated blockchain data corresponding to execution of a smart contract to release the print job. Included is data corresponding to time stamp 1076, sender 1078, smart contract recipient 1080, debit amount 1082 and an instruction 1084 to execute the smart contract.

Figure 11:
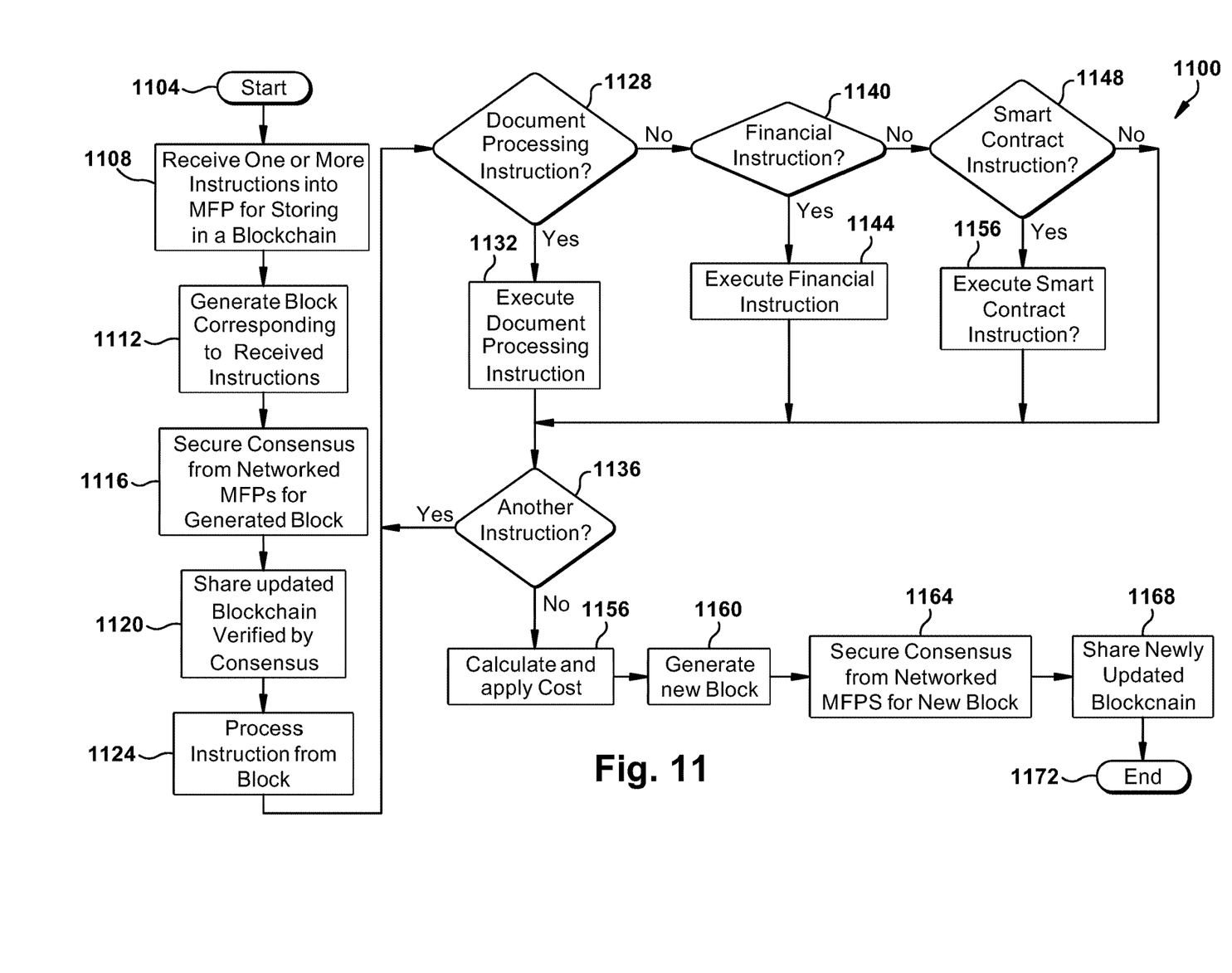
FIG. 11 is a flowchart of an example embodiment of a blockchain based system for undertaking of document processing, financial transaction or smart contract instructions.

FIG. 11 is a flowchart 1100 of an example embodiment of a blockchain based system for undertaking of document processing, financial transaction or smart contract instructions. The process commences at block 1104 and proceeds to block 1108 where one or more instructions are received for storing in a blockchain. Example instructions include document processing instructions, financial instructions or smart contract instructions. Document processing instructions include instructions for processing of electronic documents such as by scanning or printing, including commencing a job or releasing a job. A print job is suitably released by any of networked MFPs as might be specified by a user. Financial instructions may include a funds transfer, funds debit associated with device usage or smart contracts, or funds credit, such as when a party is paid for performance under a smart contract.

Next, an updated blockchain block is generated at block 1112 in accordance with received one or more received instructions. A consensus relative to the generated block is received from other networked devices at block 1116, and an update blockchain shared among the networked devices at block 1120. Instructions from the verified block of the updated blockchain are processed at block 1124. A check is made at block 1128 to determine if an instruction is related to document processing. If so, progress is made to block 1132 to execute the instruction and progress continues to block 1136. If no document processing instruction is determined to exist at block 1128, a check is made at block 1140 if an instruction is related to financial information. If so, the financial instruction is executed at block 1144 and progress continues to block 1136. If no financial instruction is determined at block 1140, a check is made at block 1148 to determine if a smart contract instruction exists. If so, the instruction is executed at block 1156 and progresses to block 1136. If no smart contract instruction exists, progress is directly to block 1136. At block 1136, a check is made as to whether another instruction remains. If so, the process returns to block 1128. Otherwise progress continues to block 1156.

At block 1156, costs associated with processing the one or more instructions are calculated and applied, and a new block is generated at block 1160. Consensus is secured from networked devices at block 1164, and the newly updated blockchain is shared at block 1168. The process then ends at block 1172.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
a processor configured to receive an instruction;
a network interface;
a print engine;
a scan engine configured to scan a multi page tangible document comprising a paper wallet page bearing indicia corresponding to an encoded currency value and a smart contract page bearing indicia corresponding to a smart contract; and
a memory storing a blockchain ledger, the blockchain ledger including a plurality of time stamped blocks, each block including currency data associated with a digital currency value,
wherein the processor is further configured to decode a scanned paper wallet page to generate a currency value,
wherein the processor is further configured to determine a smart contract in accordance with a scanned smart contract page,
wherein the processor is further configured to generate a block corresponding to a received instruction, the currency value associated with the received instruction and contract data corresponding to the smart contract associated with the received instruction,
wherein the processor is further configured to update the blockchain ledger with a generated block,
wherein the processor is further configured to share the updated blockchain ledger with a plurality of networked data devices via the network interface,
wherein the processor is further configured to receive verification of the updated blockchain ledger from the plurality of networked data devices via the network interface,
wherein the processor is further configured to execute the smart contract upon receipt of verification,
wherein the processor is further configured to an updated currency value corresponding to a cost associated with the executed smart contract, and
wherein the processor is further configured to generate a printout including indicia corresponding to an encrypted updated currency value.

2. The system of claim 1 wherein the processor is further configured to:
generate a new block corresponding to execution of the smart contract, the new block including the undated currency value, and
update the blockchain ledger with the new block.

3. The system of claim 2 wherein the smart contract is comprised of an exchange of currency.

4. The system of claim 2 wherein the smart contract is comprised of a document processing operation.

5. The system of claim 4 wherein the document processing operation is associated with operation of the print engine or the scan engine.

6. The system of claim 5 wherein the updated currency value further corresponds to a page count for a number of pages associated with the document processing operation.

7. A method comprising:
receiving an instruction into a processor;
scanning a multipage tangible document comprising a paper wallet page bearing indicia corresponding to an encoded currency value and a smart contract page bearing indicia corresponding to a smart contract;
decoding a currency value from the scanned indicial;
scanning a tangible document comprising a paper wallet including indicia corresponding to a smart contract;
storing, in memory, a blockchain ledger, the blockchain ledger including a plurality of time stamped blocks, each block including currency data associated with a digital currency value;
generating a block corresponding to a received instruction, the currency and contract data corresponding to the smart contract;
updating the blockchain ledger with the generated block;
sharing an updated blockchain ledger with a plurality of networked data devices via a network interface;

receiving verification of the updated blockchain ledger from the plurality of networked data devices via the network interface;

executing the smart contract upon receipt of verification;

generating n updated currency value corresponding to a cost associated with execution of the smart contract; and generating a printout including indicia corresponding to an encrypted updated currency value.

8. The method of claim 7 further comprising:

generating a new block corresponding to execution of the smart contract, the new block including the updated currency value; and updating the blockchain ledger with the new block.

9. The method of claim 8 further comprising exchanging currency in accordance with execution of the smart contract.

10. The method of claim 8 further comprising commencing a document processing operation specified by the smart contract.

11. The method of claim 10 wherein the document processing operation is comprised of scanning or printing a document.

12. The method of claim 11 further comprising generating the updated currency value corresponding to a page count for a number of pages associated with the document processing operation.

13. A system comprising:

a plurality of networked multifunction peripherals; and a blockchain ledger shared among the multifunction peripherals via associated network interfaces, the blockchain ledger comprised of a plurality of time stamped blocks, each block including currency data corresponding to a digital currency value, wherein a first multifunction peripheral of the plurality of multifunction peripherals includes a processor configured to receive an instruction, scan a multipage tangible document comprising a paper wallet page bearing indicia corresponding to an encoded currency value, scan a smart contract page bearing indicia corresponding to a smart contract, generate a block corresponding to a received instruction, the currency value associated with the received instructions and contract data corresponding to the smart contract, communicate data corresponding to a generated block to two or more of the networked multifunction peripherals, receive a consensus response from the two or more networked multifunction peripherals, update the blockchain ledger with the generated block when the consensus response indicates acceptability of the generated block; and share the updated blockchain ledger with the plurality of networked multifunction peripherals via the network interface;

wherein at least one networked multifunction peripheral is configured to execute the smart contract when the consensus response indicates acceptability of the generated block, and wherein the first multifunction peripheral is further configured to generate an updated currency value corresponding to a cost associated with the smart contract, and generate a printout including indicia corresponding to an encrypted updated currency value.

14. The system of claim 13 wherein the instruction is comprised of a document processing operation to be performed on one or more of the networked multifunction peripherals as specified by the smart contract.

* * * * *